Patented June 13, 1944

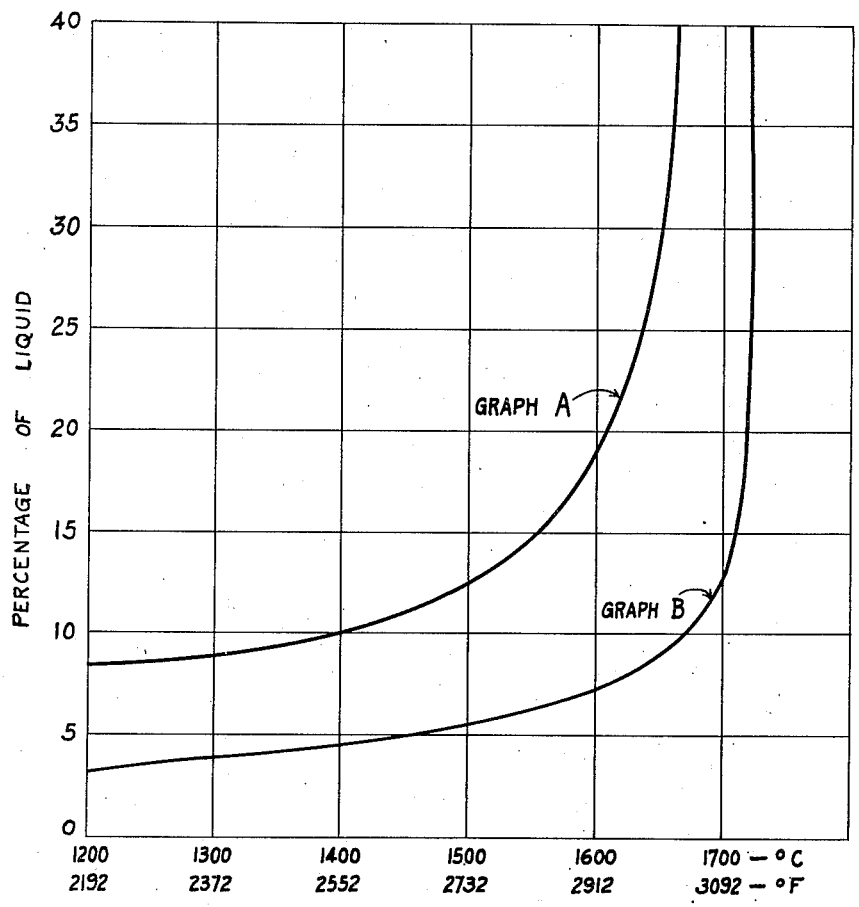

2,351,204

UNITED STATES PATENT OFFICE 2,351,204

SILICA REFRACTORY

Frederic A. Harvey, Pittsburgh, and Raymond E. Birch, Mount Lebanon, Pa., assignors to Harbison-Walker Refractories Company, Pittsburgh, Pa., a corporation of Pennsylvania Application November 30, 1940, Serial No. 367,910

10 Claims. (Cl. 106—58)

This invention relates to silica refractories, especially shaped refractories such, for example, as bricks.

Silica refractories are used extensively, particularly in the metallurgical industries, on account of their desirable properties, particularly their high melting point and their rigidity and strength at high temperatures. For instance, they are used almost exclusively in the construction of roofs of open hearth steel furnaces, which represent perhaps the most severe operating conditions to which these refractories are exposed.

Modern commercially available silica refractories perform satisfactorily if rigid precautions are observed in operation of open hearth furnaces, but the need for such extreme care has imposed undesirable limitations on furnace operation. For instance, Robert B. Sosman, one of the leading ceramists in this country, has pointed out in an article published in 1938 in the Journal of the American Ceramic Society, vol. 21, beginning at page 37, that in the operation of an open hearth steel furnace the operator must at all costs keep his roof below about 1650° C. (3000° F.), because otherwise the silica refractory brick will melt and the roof will collapse. On the other hand, the melting point of steel is such that to insure its being at a temperature, when tapped, which will be sufficient to permit its being handled and cast satisfactorily, the furnace must be operated at temperatures very close to the maximum to which the roof may safely be subjected. Thus, the Carnegie Steel Company in its "The Making, Shaping and Treating of Steel," (4th edition), states at page 319 that when tapped from the furnace the steel should be at least 150° C. above its melting point, and at page 323 that low carbon steel when tapped should be at 1600° C., or a little higher, which is, according to Sosman, very close to the maximum safe temperature at which silica brick can be operated in the open hearth furnace. And in the article referred to, Dr. Sosman states that near the end of the making of a heat of steel the gradient between the temperature of the metal and the safe operating temperature of the roof is less than 65° C., and often not more than 50° C. Such operating conditions obviously necessitate rigid temperature control, yet the furnace temperature must be maintained to keep up tonnage output. When consideration is given to the large amounts of heat delivered to such a furnace per unit of time, it will be realized that such conditions impose operative difficulties both to avoid destruction of the roof and also to maintain furnace output.

It is among the objects of this invention to provide silica refractories of substantially increased refractoriness relative to those available heretofore, without interfering with or substantially altering present modes of producing such refractories, and without substantially increasing production costs.

A further object is to provide silica brick which are capable of carrying to higher temperatures without failure the same loads as the silica brick available commercially prior to the invention.

Other objects will appear from the following specification.

The accompanying drawing is a graph showing the melting behavior of high quality commercial silica brick in comparison with those made according to this invention.

Silica brick are commonly made from hard quartzite or ganister rock to which milk of lime is added as a bonding agent. Typical practice is to crush and grind the rock to provide a suitable proportion of coarse and fine grain sizes. The sized rock is then mixed with milk of lime and water in a mixing pan, and refractory shapes are made from the intimately mixed batch, as by hand molding or pressing. The shaped articles are then dried and fired to temperatures generally exceeding about 2600° F. Drying hardens the bond so that the bricks will have sufficient strength to support those set above them in the kiln. Firing develops a permanent bond which sustains the brick during handling and subsequent industrial use. It is generally considered that the permanent bond is due, at least for the most part, to recrystallization of silica, although the bonding strength may be, and probably is, contributed to by crystalline silicates or glasses of compounds of lime with silica and with impurities present in the rock.

Although the composition of silica refractories will vary according to the composition of the original rock and manufacturing practice, it may be said that in general silica refractories contain more than about 95 per cent of silica, from about 0.75 to 1.5, or even 2, per cent of alumina, about 0.5 to 1.6 per cent of ferric oxide, about 1.5 to 2 per cent of lime, and not over about 0.5 per cent each of magnesia and alkalies, together with small amounts of other impurities.

It has been known for many years that impurities such as alumina reduce the refractoriness of silica refractories, but up to the present time the general belief in the trade has been that the advantages of alumina in the amounts stated above offset its deleterious effect upon refractoriness, so that no attempt has been made to reduce the alumina content of these refractories below the general range stated. Thus, as noted above, the strength and rigidity of these refractories is due primarily to recrystallization of the silica in the ganister or other silica rock used, and a major function of the lime used in making silica refractories is to effect the inversion of quartz to tridymite to that end. Alumina is much more potent as a mineralizer in causing that inversion than is lime, and it has been thought that the small amounts of alumina present have contributed to the production of strong refractories. Also, experience has shown that the elimination of alumina caused the brick to develop ugly brown to red discolorations, known commonly as "liver spots." Furthermore, breakage or loss of brick in firing was increased seriously when attempts were made to eliminate alumina, and a common belief is that alumina is necessary to obtain low porosity in silica brick. In consequence it has been believed heretofore impractical and undesirable in the commercial production of silica refractories to reduce the content of alumina below the general range stated above. Alkalies, determined as sodium and potassium oxide, are known also to reduce refractoriness, but they are usually present in such small amounts that no particular attention has been paid to them.

We have discovered, and it is upon this that our invention is in large part predicated, that in addition to the effect of impurities on the refractoriness of silica refractories, certain relationships not hitherto known or recognized are important in controlling refractoriness, and that by restricting the amounts of certain impurities and controlling their relationship to others, very substantial increase in refractoriness may be attained. In fact, silica refractories made in accordance with our invention are sufficiently more refractory than those produced commercially heretofore to warrant their being designated as super-duty silica refractories.

More particularly, the impurities present in silica refractories are, for the purposes of the invention, to be classified in several groups. The first of these, which may be termed group A, comprises certain of the oxides which have an adverse effect upon refractoriness, namely, alumina, titania, and alkalies. The second group, termed herein group B, is made up of those oxides which when intimately mixed in small percentages with silica and brought to complete melting produce two immiscible liquids. This second group includes the lime and magnesia commonly present in silica refractories, together with other oxides that may be encountered, usually in small amounts, in these refractories such, for example, as strontia, manganese oxide, zinc oxide, ferrous oxide, nickel oxide, and cobalt oxide.

We have discovered that silica refractories of substantially improved refractoriness, and embodying the objects of the invention, are produced by restricting the total amount of the group A oxides to not over about 0.5 per cent, and preferably less than 0.4 per cent, and by having the total amount of the group B oxides exceeding the sum of the first-named group by at least 3.3 to 1 but not over about 5.0 per cent total, and preferably a maximum of 2.5 per cent. Silica refractories of such composition possess substantially improved refractoriness as compared with those made heretofore, and we find that they are not subject to the disadvantages which have been encountered in attempts to make silica refractories free from or of extremely low alumina content, as will appear more fully hereinafter.

We have found also that for the most satisfactory results the ferric oxide should not exceed about 2 per cent, and most advantageously should be not over about 0.6 per cent.

The remainder of the refractories will consist of silica together with impurities, other than those identified above, in the amounts customarily found in silica refractories.

As an example of the advantages of the invention, silica refractories were made, using standard production methods, which were of the following composition:

| | Per cent |
|---|---|
| $SiO_2$ | 97.02 |
| *Group A oxides* | |
| $Al_2O_3$ | 0.25 |
| $TiO_2$ | 0.03 |
| $Na_2O + K_2O$ | 0.08 |
| Total | 0.36 |
| *Group B oxides* | |
| CaO | 1.86 |
| MgO | 0.04 |
| Total | 1.90 |
| Ferric oxide | 0.50 |

These conform, as will be observed, to the relationships set forth hereinabove. When tested under a load of 25 pounds per square inch these refractories did not fail at 3065° F. (1685° C.), although high quality silica brick previously made commercially failed at 3000° F. (1649° C.) and lower in the same test. Nor did they liver spot or possess any of the undesirable characteristics which have previously been encountered in attempts to produce brick of low alumina content. Laboratory tests made upon these brick showed that silica refractories made in accordance with this invention can be used at temperatures approximately 100° F. higher than the maximum which is possible with the best silica refractories made commercially prior to this invention. Although this differential is not of great magnitude, its importance is real and practical in view of the conditions which prevail in, for example, open hearth steel furnace operation as alluded to hereinabove. Thus, the ability to operate an open hearth steel furnace roof at a temperature 100° F. above that now possible will greatly reduce operating difficulties and insure a considerable increase in production from a given furnace without the danger of failure of its roof. Practically, with refractories operating at temperatures of the order of 3000° F. (1649° C.), an increase in refractoriness of 100° F. is of major importance.

The improvement in refractoriness indicated by the foregoing tests is being actually borne out in service. Silica brick made in accordance with this invention were installed in a furnace roof together with ordinary commercially available silica brick of high quality. The brick made according to this invention retained their rigid form when the commercial brick beside them had begun to drip due to melting.

The benefits derivable from the invention are exemplified graphically in the accompanying drawing, the graphs of which are based upon the best available data pertaining to this refractory system. Graph A represents the melting behavior of a high quality silica brick which is considered to be one of the best commercially available. It contained 1.2 per cent total of alumina and alkalies, and 2.0 per cent of lime. Graph B similarly represents the melting behavior of a brick made in accordance with this invention containing a total of 0.4 per cent of alumina, titania and alkalies, with 1.5 per cent of lime.

From the graphs it appears that brick made in accordance with this invention do not develop 10 per cent of liquid until they are at a temperature almost 500° F. (260° C.) above that productive of this amount of melting in the high grade commercial brick. In terms of refractoriness, i. e., the maximum temperature to which the two types of brick could stand in service, the difference would seem to be of the order of approximately 100° F.

We have found also that although lime may be used, as in present commercial practice, as the bonding agent for these silica refractories, other oxides of the alkaline earth group may be used. For example, the indications are that superior refractoriness may be obtained by using magnesia in place of lime as the bond. Thus, the best data available indicate that using lime as a bond in the manner described hereinabove the first trace of melting in the refractory would begin at about 2129° F. (1165° C.), whereas if magnesia be used in place of lime liquid would not appear until a temperature of 2457° F. (1347° C.) is reached. Making such substitution of MgO for CaO, the relationships explained hereinabove and upon which the invention is predicated would be maintained. Or, dolomite or dolomitic lime might be used to supply both lime and magnesia as bond. Ordinary caustic magnesite may not be a wholly satisfactory source of magnesia because the dried brick may not have ample strength although the fired brick will be of satisfactory character. Where caustic magnesite is used, however, the dried strength may be increased by the use of an organic binder, such as sulfite waste liquor, or by the use of magnesium chloride, as a temporary binder. Such temporary binders may, of course, be used in any event in the production of refractories in accordance with this invention.

In the practice of the invention the refractories are made in accordance with standard manufacturing practice, using silica raw material of a composition which when mixed with the lime binder will produce a refractory in conformity with the composition relationships explained hereinabove. Such silica material suitable for the purposes of the invention may be produced, for example, by washing of high purity silica materials, or by other means available to the art.

The substantial increase in refractoriness of products conforming to the invention will be clear from what has been said. It may be added that our experience to date is that in the practice of this invention porosity is not sacrificed, the brick do not liver spot excessively, and they do not possess any of the extreme characteristics which have been ascribed to or have prevented the manufacture of silica brick of such low alumina content as characterizes the invention.

In the foregoing specification and in the claims reference is made to the refractories in terms of oxides because this is the usual manner of reporting such compositions, and this will be understood by those skilled in the art. Also, the claims call for stated amounts of oxides of group B, i. e., those oxides which produce two immiscible liquids when heated in small amounts with silica. It will be understood that the word "oxides" as so used contemplates the presence of one or a plurality of these oxides, the criterion being that the total amount of group B material respond to the limitation of the claims whether that amount be composed of one or several such group B oxides.

According to the provisions of the patent statutes, we have explained the principle and method of practicing our invention and have illustrated and described what we now consider to represent its best embodiments. However, we desire to have it understood that, within the scope of the appended claims, the invention may be practiced otherwise than as specifically illustrated and described.

We claim:

1. A super-duty silica refractory brick containing alumina, titania and alkalies in a total amount not over about 0.5 per cent, at least one oxide of the group consisting of oxides of calcium, magnesium, strontium, manganese, zinc, nickel, cobalt, and ferrous iron, the total amount of the oxides of said group exceeding the sum of the alumina, titania and alkalies by at least 3.3 to 1 but being not over about 5 per cent, and the remainder substantially all silica.

2. A super-duty silica refractory brick containing alumina, titania and alkalies in a total amount not over about 0.4 per cent, at least one oxide of the group consisting of oxides of calcium, magnesium, strontium, manganese, zinc, nickel, cobalt, and ferrous iron, the total amount of the oxides of said group exceeding the sum of the alumina, titania and alkalies by at least 3.3 to 1 but being not over about 2 per cent, ferric oxide not over about 2 per cent, and the remainder substantially all silica.

3. A super-duty silica refractory brick containing alumina, titania and alkalies in a total amount not over about 0.4 per cent, at least one oxide of the group consisting of oxides of calcium, magnesium, strontium, manganese, zinc, nickel, cobalt, and ferrous iron, the total amount of the oxides of said group exceeding the sum of the alumina, titania and alkalies by at least 3.3 to 1 but being not over about 2.5 per cent, ferric oxide not over about 0.6 per cent, and the remainder substantially all silica.

4. A super-duty silica refractory brick made from high silica material and an alkaline earth oxide as a bond, said brick containing alumina, titania and alkalies in a total amount not over about 0.5 per cent, at least one oxide of the group consisting of oxides of calcium, magnesium, strontium, manganese, zinc, nickel, cobalt, and ferrous iron, the total amount of the oxides of said group exceeding the sum of the alumina, titania and alkalies by at least 3.3 to 1 but being not over about 5 per cent, ferric oxide not over about 2 per cent, and the remainder substantially all silica.

5. A super-duty silica refractory brick made from high silica material and lime as a bond, said brick containing alumina, titania and alkalies in a total amount not over about 0.4 per cent, at least one oxide of the group consisting of oxides of magnesium, strontium, manganese, zinc, nickel, cobalt, and ferrous iron, the total amount of the lime and oxides of said group exceeding the sum of the alumina, titania and alkalies by at least 3.3 to 1 but being not over about 2.5 per cent, ferric oxide not over about 2 per cent, and the remainder substantially all silica.

6. A super-duty silica refractory brick made from high silica material and magnesia as a bond, said brick containing alumina, titania and alkalies in a total amount not over about 0.5 per cent, at least one oxide of the group consisting of oxides of calcium, strontium, manganese, zinc, nickel, cobalt, and ferrous iron, the total amount of the magnesia and oxides of said group exceeding the sum of the alumina, titania and alkalies by at least 3.3 to 1, but the total amount being not over about 5 per cent, ferric oxide not over about 2 per cent, and the remainder substantially all silica.

7. That method of making super-duty silica refractories which comprises mixing crushed silica rock with an alkaline earth oxide as a bond, the amounts of said rock and bond being so proportioned that the burned refractory will contain alumina, titania and alkalies in a total amount not over about 0.5 per cent, at least one oxide of the group consisting of oxides of calcium, magnesium, strontium, manganese, zinc, nickel, cobalt and ferrous iron, the total amount of the oxides of said group exceeding the sum of the alumina, titania and alkalies by at least 3.3 to 1 but being not over about 5 per cent, and the remainder substantially all silica; tempering the mixture, then forming shapes from the tempered batch, and drying the formed shapes.

8. That method of making super-duty silica refractories which comprises mixing crushed silica rock with lime as a bond, the amounts of said rock and bond being so proportioned that the burned refractories will contain alumina, titania and alkalies in a total amount not over about 0.5 per cent, lime and at least one oxide of the group consisting of oxides of magnesium, strontium, manganese, zinc, nickel, cobalt and ferrous iron, the total amount of the lime and oxides of said group exceeding the sum of the alumina, titania and alkalies by at least 3.3 to 1 but being not over about 2.5 per cent, ferric oxide not over about 2 per cent, and the remainder substantially all silica; tempering the mixture, then forming shapes from the tempered batch, and drying and burning the formed shapes.

9. That method of making super-duty silica refractories which comprises mixing crushed silica rock with lime as a bond, the amounts of said rock and bond being so proportioned that the burned refractories will contain alumina, titania and alkalies in a total amount not over about 0.5 per cent, lime and at least one oxide of the group consisting of oxides of magnesium, strontium, manganese, zinc, nickel, cobalt and ferrous iron, the total amount of the oxides of said group exceeding the sum of the alumina, titania and alkalies by at least 3.3 to 1 but being not over about 2.5 per cent, ferric oxide not over about 0.6 per cent, and the remainder substantially all silica; tempering the mixture, then forming shapes from the tempered batch, and drying and burning the formed shapes.

10. That method of making super-duty silica refractories which comprises mixing crushed silica rock with magnesia as a bond, the amounts of said rock and bond being so proportioned that the burned refractories will contain alumina, titania and alkalies in a total amount not over about 0.4 per cent, magnesia and at least one oxide of the group consisting of oxides of calcium, strontium, manganese, zinc, nickel, cobalt and ferrous iron, the total amount of the oxides of said group exceeding the sum of the alumina, titania and alkalies by at least 3.3 to 1 but being not over about 2.5 per cent, ferric oxide not over about 0.6 per cent, and the remainder substantially all silica; tempering the mixture, then forming shapes from the tempered batch, and drying and burning the formed shapes.

FREDERIC A. HARVEY.
RAYMOND E. BIRCH.